United States Patent
Nishida

(10) Patent No.: US 7,098,627 B2
(45) Date of Patent: Aug. 29, 2006

(54) METHOD AND APPARATUS FOR BATTERY CHARGING WITH CONSTANT CURRENT, CONSTANT VOLTAGE, AND PULSED CHARGING

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 213 days.

(21) Appl. No.: 10/626,732

(22) Filed: Jul. 25, 2003

(65) Prior Publication Data

US 2004/0195996 A1    Oct. 7, 2004

(30) Foreign Application Priority Data

Jul. 30, 2002    (JP) .............................. 2002-221390

(51) Int. Cl.
*H02J 7/06* (2006.01)
(52) U.S. Cl. ...................................... 320/159; 320/139
(58) Field of Classification Search ........ 320/157–159, 320/155, 137–139, 110–114, 141, 148, 149, 320/152, 160, 162, 164; 324/426–429, 433, 324/436
See application file for complete search history.

(56) References Cited

U.S. PATENT DOCUMENTS 5,500,584 A * 3/1996 Shimomoto ................. 320/159
5,710,506 A * 1/1998 Broell et al. ................. 320/145
5,808,446 A * 9/1998 Eguchi ........................ 320/134
6,452,364 B1 * 9/2002 Saeki et al. ................. 320/137

FOREIGN PATENT DOCUMENTS

JP    2001-169471    6/2001

* cited by examiner

*Primary Examiner*—Karl Easthom
*Assistant Examiner*—Aaron Piggush
(74) *Attorney, Agent, or Firm*—Dickstein Shapiro Morin & Oshinsky LLP

(57) ABSTRACT

A second battery charging apparatus includes a voltage detecting circuit, a current detecting circuit, a charging circuit, and a charge control circuit. The voltage detecting circuit detects a battery voltage of the second battery and accordingly outputs a signal. The current detecting circuit detects a battery current supplied to the second battery and accordingly outputs a signal. The charging circuit executes a current supply control to perform the charging to the second battery such that the battery voltage becomes equal to a voltage predetermined based on control signals and also that the charging current becomes equal to a current predetermined based on the control signals. The charge control circuit instructs the charging circuit with the control signals to set the battery voltage and the charge current in response to a voltage indicated by the signal from the voltage detecting circuit.

11 Claims, 8 Drawing Sheets

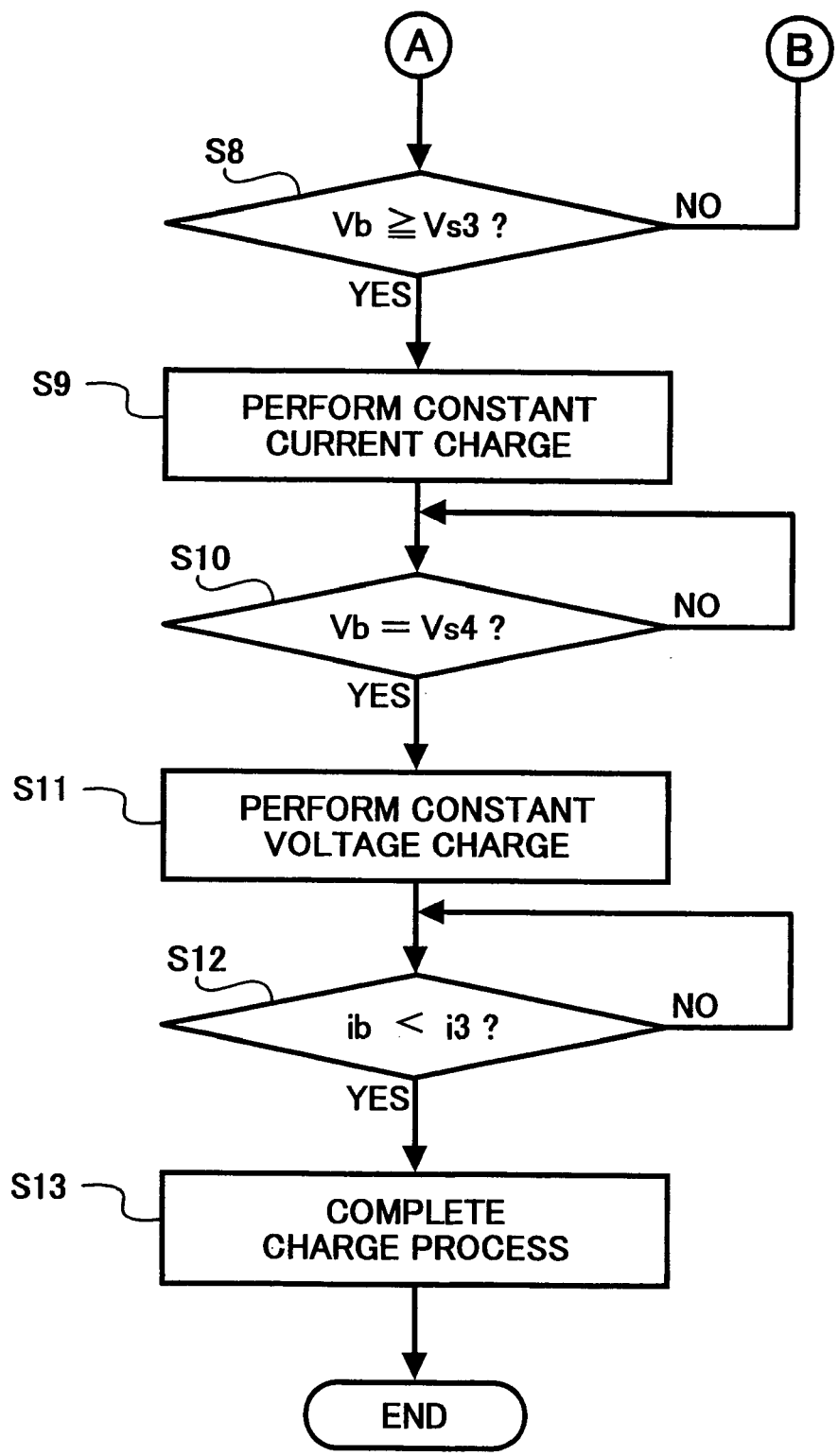

METHOD AND APPARATUS FOR BATTERY CHARGING WITH CONSTANT CURRENT, CONSTANT VOLTAGE, AND PULSED CHARGING

CROSS-REFERENCE TO RELATED APPLICATIONS

This patent application claims priority from Japanese patent application; No. JPAP2002-221390, filed on Jul. 30, 2002 in the Japanese Patent Office, the entire contents of which are herein incorporated by reference.

FIELD OF THE INVENTION

The present invention relates to a method and apparatus for battery charging, and more particularly to a method and apparatus for battery charging to a nonaqueous second battery efficiently using constant current charging, constant voltage charging, and pulse charging in combination.

BACKGROUND OF THE INVENTION

Conventionally, continuous charging and pulse charging are common methods for charging a nonaqueous second battery such as a lithium ion battery, an Ni—MH battery, etc. Continuous charging may be grouped into CC (constant current) charging, CV (constant voltage) charging, and CCCV (constant-current constant-voltage) charging, which combines the CC charging and the CV charging. In the charging of a nonaqueous second battery, it is necessary to exercise due care to avoid an excess charging voltage exceeding a predetermined voltage since such an excessive charging voltage considerably deteriorates the battery performance.

Thus, in order to avoid excessive charging voltage, the CCCV charging is generally used as the continuous charging method. In the CCCV charging method, charging with a constant current is performed at an early stage of the charging to the second battery and charging with a constant voltage is subsequently performed after a battery voltage of the second battery reaches a predetermined voltage. When the charging current (also referred to herein as "charge current" and "battery current") is reduced to a predetermined value, the second battery is in a fully-charged state and the charging is completed. One advantage of this method is the possibility of rapid charging by setting the charging current used in the constant current charging during the early stage of the charging to a relatively large value. Another advantage is the prevention of deterioration of the second battery due to application of excessive voltage since the charging mode is shifted from CC charging to CV charging when the battery voltage of the second battery reaches a predetermined voltage.

However, when the constant current used in the initial charging stage is set to an excessively large value, a heat production by the second battery becomes large, which causes several problems: a reduction of charging efficiency, an acceleration of deterioration with respect to the second battery, etc. On the other hand, pulse charging has an advantage of less deterioration to the second battery because pulse charging is provided with pause times at certain intervals during the charging period, which increases efficiency of electrochemical changes. Additionally, pulse charging allows a relatively large charging current and therefore, is suitable for rapid charging as well.

For example, Japanese Laid-Open Patent Application Publication No. 2001-169471 describes a second battery charging apparatus that features advantages of both continuous charging and pulse charging. This apparatus attempts to avoid over-charging while suppressing heat production of the second battery. That is, the continuous charging is performed during the initial charging and the charging mode is switched to the pulse charging when the battery voltage in the charging exceeds a predetermined voltage V1 depending on battery temperature. When the battery voltage with an open circuit in pulse charging exceeds a predetermined voltage V3, the mode is switched from the pulse charging to the continuous charging. Then, the charging is stopped when the battery voltage in the second battery reaches a predetermined voltage V2.

For such a charging apparatus, miniaturization has increasingly been an issue recently, as mobile equipment such as cellular phones and the like using a second battery becomes widespread. In particular, charging apparatus for cellular phones are often carried along with a cellular phone. Such mobility requires a relatively short charging time to make the cellular phone operable and also requires a compact and light body producing less heat. The charge required to make the cellular phone operable may not be a full charge. The charge time to reach less than fully-charged state may be correspondingly less than the time to fully charge the second battery.

However, conventional charging apparatus have been designed with a view mainly to reducing a charging time to the full-charge state and/or suppressing a temperature rise of the battery. To reduce the charging time, it is necessary to charge with a relatively large current. As a result, the charging apparatus produces a relatively large amount of heat and accordingly the size of the charging apparatus may become large. Since the temperature of the second battery rises, a temperature detection mechanism is additionally needed, resulting in an increase of the size and complexity of the apparatus itself. In addition, charging with such large current often accelerates deterioration of ionization with respect to the second battery.

BRIEF SUMMARY OF THE INVENTION

The present invention provides battery charging techniques capable of performing a quick charge to a second battery while suppressing heat production and deterioration of the second battery.

In one example, a novel second battery charging apparatus includes a voltage detecting circuit, a current detecting circuit, a charging circuit, and a charge control circuit. The voltage detecting circuit detects a battery voltage of the second battery and outputs a signal in response to the battery voltage detected. The current detecting circuit detects a battery current supplied to the second battery and outputs a signal in response to the battery current detected. The charging circuit controls a current supply to the second battery to perform the charging of the second battery until the battery voltage detected by the voltage detecting circuit becomes substantially equal to a battery voltage predetermined in response to a first input control signal applied thereto also such that the charging current detected by the current detecting circuit becomes substantially equal to a charging current predetermined in response to a second input control signal applied thereto. The charge control circuit instructs the charging circuit by sending the input control signals to set the battery voltage and the charge current in response to a voltage indicated by the signal output from the voltage detecting circuit.

The charge control circuit may instruct the charging circuit to perform a constant current charging in which a charging is performed flowing a first constant current to the second battery and subsequently another charging is performed flowing a second constant current greater than the first current to the second battery when the battery voltage of the second battery is smaller than a second pre-set voltage. Further, the charge control circuit may instruct the charging circuit to alternately flow a second constant current to the second battery and pause the flow of the second constant current to the second battery, for a pre-set time. Pausing the second constant current flow stops the charging current to the second battery.

The charge control circuit may instruct the charging circuit to control the charging current flowing to the second battery such that the battery voltage becomes substantially equal to a third constant voltage during the constant current charging during the pulse charging cycle and also such that the battery voltage becomes substantially equal to the first constant voltage smaller than a third constant voltage during the pause during the pulse charging cycle.

The charge control circuit may instruct the charging circuit to perform the constant current charging to supply the second constant current to the second battery when the battery voltage becomes substantially equal to a third pre-set voltage greater than the second pre-set voltage and also to perform the constant voltage charging to control the charging current such that the battery voltage becomes substantially equal to the third constant voltage when the battery voltage becomes substantially equal to a fourth pre-set voltage greater than the pre-third set voltage.

The charge control circuit may instruct the charging circuit to control the charging current flowing through the second battery such that the battery voltage becomes substantially equal to the third constant voltage during the constant current charging before pulse charging is performed.

The charge control circuit may instruct the charging circuit to control the charging current flowing through the second battery such that the battery voltage becomes substantially equal to the first constant voltage when the battery voltage is smaller than the first pre-set voltage which is smaller than the second pre-set voltage. The charge control circuit may further instruct the charging circuit to control the charging current flowing through the second battery such that the battery voltage becomes substantially equal to the second constant voltage, which is smaller than the third constant voltage and greater than the first constant voltage, during constant current charging before pulse charging is performed.

The charging circuit may include a constant voltage generating circuit, a signal switching circuit, a voltage switching circuit, a control transistor and a control circuit. The constant voltage generating circuit generates first, second, and third constant voltages. The voltage switching circuit selects and outputs one of the first and third constant voltages output from the constant voltage generating circuit in response to the control signals from the control circuit. The control transistor outputs a current to the second battery in response to an input control signal applied thereto. The control circuit controls the control transistor such that the battery voltage represented by a signal output from the voltage detecting circuit becomes substantially equal to a voltage represented by a signal output from the voltage switching circuit and such that the charging current represented by a signal output from the current detecting circuit becomes substantially equal to a constant current represented by a signal output from the signal switching circuit.

The charging circuit may include a constant voltage generating circuit, a signal switching circuit, a voltage switching circuit, a control transistor, and a control circuit. The constant voltage generating circuit generates first, second, and third constant voltages. The voltage switching circuit selects and outputs one of the first and third constant voltages output from the constant voltage generating circuit in response to the control signals from the charge control circuit. The control transistor outputs a current to the second battery in response to an input control signal applied thereto. The control circuit controls the control transistor such that the battery voltage represented by a signal output from the voltage detecting circuit becomes substantially equal to a voltage represented by a signal output from the voltage switching circuit and such that the charging current represented by a signal output from the current detecting circuit becomes substantially equal to a constant current represented by a signal output from the signal switching circuit.

The above-mentioned charging apparatus may further include a charge-end detecting circuit that determines an event that charging is completed relative to the second battery and outputs a predetermined signal when the charging current detected by the current detecting circuit becomes lower than the first constant current. In this case, the charge control circuit causes the charging circuit to stop charging upon receiving the signal indicative of a charge-end output from the charge-end detecting circuit.

The first constant voltage may be a voltage greater than an over discharge voltage of the second battery and the third constant voltage may be a voltage substantially equal to a fill charge voltage of the second battery.

The current detecting circuit may include a resistor and a current detector. The resistor passes the charging current to be supplied to the second battery. The current detector detects the charging current based on a voltage across the resistor and outputs a signal in response to the detected charging current. In this case, the voltage detecting circuit, the current detector of the current detecting circuit, the charge control circuit, the charge-end detecting circuit, and several components of the charging circuit including the constant voltage generating circuit, the voltage switching circuit, the constant current reference signal generating circuit, the signal switching circuit, and the voltage switching circuit are integrated into a single integrated circuit chip.

The current detecting circuit may include a resistor and a current detector. The resistor passes the charging current to be supplied to the second battery. The current detector detects the charging current based on a voltage across the resistor and outputs a signal in response to the detected charging current. In this case, the voltage detecting circuit, the current detector of the current detecting circuit, the charge control circuit, the charge-end detecting circuit, and several components of the charging circuit including the constant voltage generating circuit, the voltage switching circuit, the constant current reference signal generating circuit, the signal switching circuit, and the voltage switching circuit are integrated into a single integrated circuit chip.

The second battery may be a nonaqueous second battery such as a lithium ion battery.

In one example, a charging method for a second battery includes the acts of: performing a first constant current charging by supplying a first constant current to the second battery when a battery voltage of the second battery is smaller than a first set voltage; performing a second constant current charging by supplying a second constant current greater than the first constant current to the second battery when the battery voltage of the second battery is greater than the first pre-set voltage; pulse charging of the second battery when the battery voltage of the second battery becomes equal to or greater than a second pre-set voltage, which is greater than the first pre-set voltage by alternately carrying out at intervals of a predetermined time period constant current charging, in which the second constant current is supplied to the second battery and a pausing in which the supply of the charging current is stopped.

The pulse charging act may include controlling the charge current to the second battery such that the battery voltage of the second battery becomes substantially equal to a third constant voltage and such that the battery voltage of the second battery becomes substantially equal to a first constant voltage smaller than a third constant voltage during the pause in the pulse charging act.

The above-mentioned charging method may further include acts of constant current charging, in which the constant current charging with the second constant current is performed to the second battery when the battery voltage of the second battery becomes substantially equal to the third pre-set voltage, which is equal to or greater than the second pre-set voltage and constant voltage charging, in which the charging current is controlled such that the battery voltage of the second battery becomes substantially equal to the third constant voltage when the battery voltage of the second battery becomes substantially equal to a fourth pre-set voltage equal to or greater than the third pre-set voltage.

The charging current to the second battery may be controlled such that the battery voltage of the second battery becomes substantially equal to the third constant voltage during the first and second constant current charging.

The charging current to the second battery may be controlled such that the battery voltage of the second battery becomes substantially equal to the first constant voltage when the battery voltage of the second battery is smaller than the first pre-set voltage during the first constant current charging and such that the battery voltage of the second battery becomes substantially equal to the second constant voltage, which is less than the third constant voltage and greater than the first constant voltage during the first constant current charging.

The above-mentioned charging method may further include acts of determining that the charging is completed when the charging current to the second battery becomes substantially equal to a predetermined current value smaller than the first constant current and subsequently terminating the charging to the second battery.

The second battery may be a nonaqueous second battery such as a lithium ion battery.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3, 3A and 3B show a flowchart of an exemplary procedure of the charging operation performed by the charging apparatus of FIG. 1;

FIGS. 6, 6A and 6B show a flowchart of an exemplary procedure of the charging operation performed by the charging apparatus of FIG. 4.

DETAILED DESCRIPTION OF THE INVENTION

Figure 1:
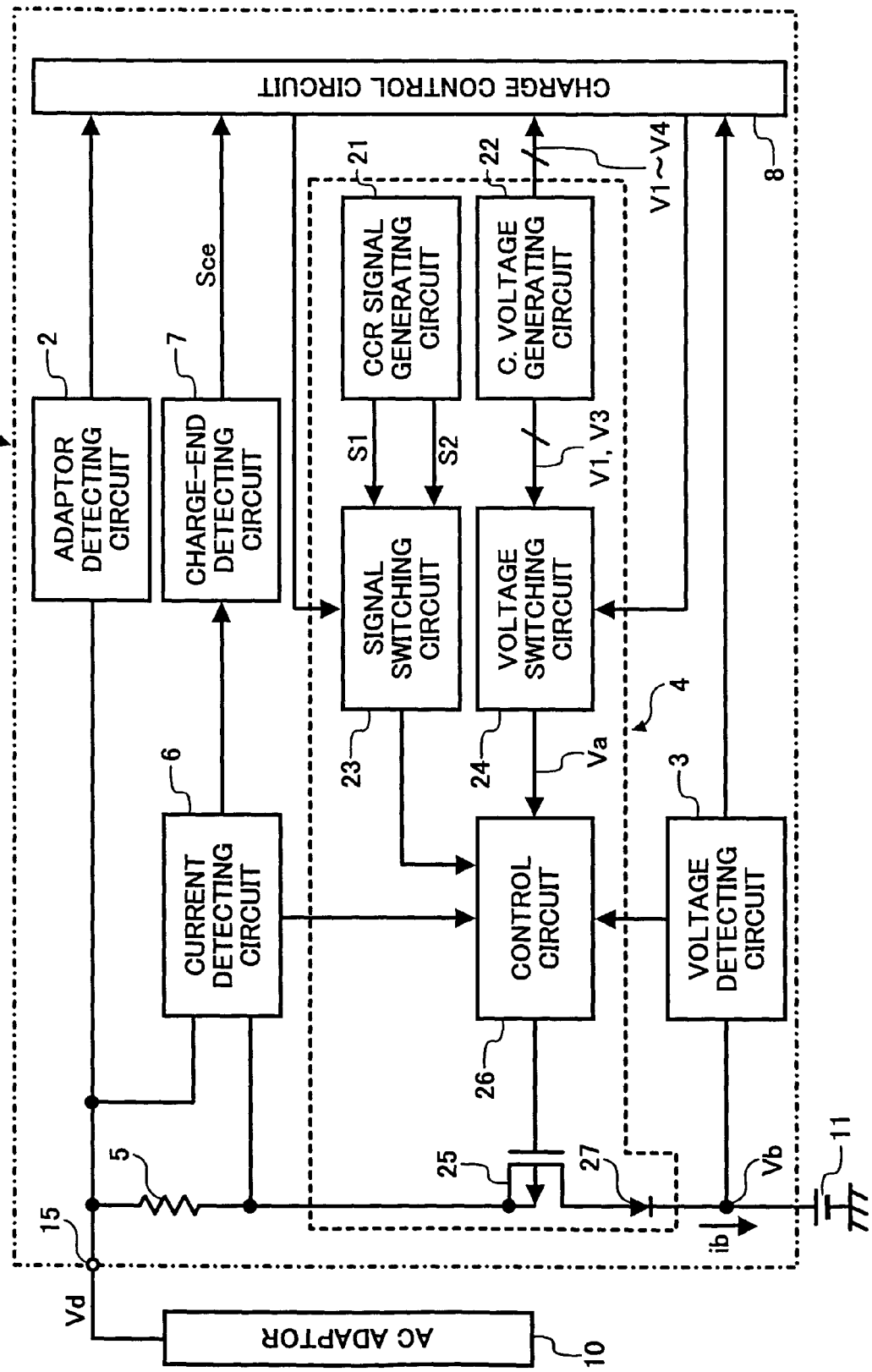
FIG. 1 is a nonaqueous second battery charging apparatus according a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a description is made for a nonaqueous-second-battery charging apparatus 1 according to a preferred embodiment of the present invention. The charging apparatus 1 of FIG. 1 includes a lithium ion battery as a nonaqueous second battery and is used in a cellular phone, for example.

As shown in FIG. 1, the charging apparatus 1 includes an adapter detecting circuit 2, a voltage detecting circuit 3, a CCCV (constant-current constant-voltage) charging circuit 4, a resistor 5, a current detecting circuit 6, a charge-end detecting circuit 7, and a charge control circuit 8. The adapter detecting circuit 2 detects a power source voltage Vd applied thereto by an AC (alternating current) adapter 10 and generates a specific current when the power source voltage Vd exceeds a predetermined voltage. The voltage detecting circuit 3 detects a positive voltage Vb of a lithium ion battery 11 which is a nonaqueous second battery and outputs a signal in response to the positive voltage Vb detected. The positive voltage of the lithium ion battery 11 is hereinafter referred to as a battery voltage. The CCCV charging circuit 4 charges the lithium ion battery 11 with a constant-current constant-voltage charge. The resistor 5 converts a charging current ib flowing from the CCCV charging circuit 4 to the lithium ion battery 11 into a voltage. The current detecting circuit 6 detects the charging current ib based on a detection of a voltage across the resistor 5 and outputs a signal in response to the charging current ib detected. The charge-end detecting circuit 7 detects an event that the charge to the lithium ion battery 11 has been completed based on the signal output from the current detecting circuit 6 and, upon detecting such event, outputs a predetermined signal. The charge control circuit 8 controls operations of the CCCV charging circuit 4 in response to the signals output from the adapter detecting circuit 2, the voltage detecting circuit 3, and the charge-end detecting circuit 7.

The CCCV charging circuit 4 includes a CCR (constant current reference) signal generating circuit 21, a constant voltage generating circuit 22, a signal switching circuit 23, a voltage switching circuit 24, a control transistor 25, a control circuit 26, and a diode 27. The CCR signal generating circuit 21 generates and outputs a first constant current reference (CCR) signal S1 indicative of a first predetermined constant current i1 and a second constant current reference signal S2 indicative of a second predetermined constant current i2, in which the second predetermined constant current i2 is greater than the first predetermined constant current i1. It should be noted that the first predetermined constant current i1 is in the range of several to a few tens of milliampere in the lithium ion battery 11. The constant voltage generating circuit 22 generates and outputs a first predetermined constant voltage V1, a second predetermined constant voltage V2, a third predetermined constant voltage V3, and a fourth predetermined constant voltage V4.

The signal switching circuit 23 selects one of the first CCR signal S1 and the second CCR signal S2 from the CCR signal generating circuit 21 in response to a control signal from the charge control circuit 8 and outputs the selected signal to the control circuit 26. The voltage switching circuit 24 selects one of the first predetermined constant voltage V1 and the third predetermined constant voltage V2 from the constant voltage generating circuit 22 in response to a control signal from the charge control circuit 8 and outputs the selected signal to the control circuit 26. The control transistor 25 includes a P-channel MOS (metal oxide semiconductor) transistor and controls a supply of the current from the AC adaptor 10 to the lithium ion battery 11. The control circuit 26 controls operations of the control transistor 25 in response to the signals from the voltage detecting circuit 3, the current detecting circuit 6, the signal switching circuit 23, and the voltage switching circuit 24.

The resistor 5, the control transistor 25, the diode 27, and the lithium ion battery 11 are connected in series between a power supply terminal to which the power from the AC adapter 10 is supplied and the ground so that the charging current is supplied to the lithium ion battery 11. The diode 27 prevents a reverse current flow from the lithium ion battery 11 to the AC adapter 10 when the voltage at the power source terminal 15 is smaller than the battery voltage Vb of the lithium ion battery 11.

Several components shown in FIG. 1 can be integrated into a single IC (integrated circuit) chip, including the adapter circuit 2, the voltage detecting circuit 3, the current detecting circuit 6, the charge-end detecting circuit 7, the charge control circuit 8, and several components of the CCCV charging circuit 4 including the constant current reference signal generating circuit 21, the constant voltage generating circuit 22, the signal switching circuit 23, the voltage switching circuit 24, and the control circuit 26. In addition, the diode 27 can also be integrated into the above-mentioned single IC chip.

When the AC adapter 10 is connected to the power source terminal 15, the voltage at the power source terminal 15 rises over a predetermined voltage. Upon detecting the rise of the voltage at the power source terminal 15 to the predetermined voltage, the adapter detecting circuit 2 outputs a signal to the charge control circuit 8 indicating that the power is supplied. The voltage detecting circuit 3 outputs signals to the charge control circuit 8 and the control circuit 26 in response to the battery voltage Vb being detected. The control circuit 26 controls a gate voltage of the control transistor 25 in response to the signals sent from the voltage detecting circuit 3, the current detecting circuit 6, the signal switching circuit 23, and the voltage switching circuit 24 so as to control the charging current ib and the battery voltage Vb with respect to the lithium ion battery 11. The current detecting circuit 6 outputs signals to the charge-end detecting circuit 7 and the control circuit 26 in response to the charging current ib detected across the resistor 5. The charge-end detecting circuit 7 outputs a predetermined charge-end signal Sce to the charge control circuit 8 upon detecting, based on the signal from the current detecting circuit 6, an event that the charging current ib is reduced to a predetermined charge-end current i3 indicative of a charge completion.

The charge control circuit 8, receiving the constant voltages V1–V4 output from the constant voltage generating circuit 22, controls the operations of the signal switching circuit 23 and the voltage switching circuit 24 in response to the signals sent from the adapter detecting circuit 2, the voltage detecting circuit 3, and the charge-end detecting circuit 7. The signal switching circuit 23, receiving the first predetermined CCR signal S1 and the second predetermined CCR signal S2 output from the CCR signal generating circuit 21, selects one of the first and second predetermined CCR signals S1 and S2 in response to the control signal from the charge control circuit 8 and outputs the selected signal to the control circuit 26. The voltage switching circuit 24, receiving the first and third constant voltage V1 and V2 from the constant voltage generating circuit 22, exclusively selects one of the first and third constant voltages V1 and V2 in response to the control signal output from the charge control circuit 8 and outputs the selected voltage to the control circuit 26.

The control circuit 26 controls the control transistor 25 such that the voltage input from the voltage detecting circuit 3 becomes substantially equal to the constant voltage input from the voltage switching circuit 24 and that the charging current ib represented by the signal input from the current detecting circuit 6 becomes substantially equal to the constant current represented by the signal input from the signal switching circuit 23.

Figure 2:
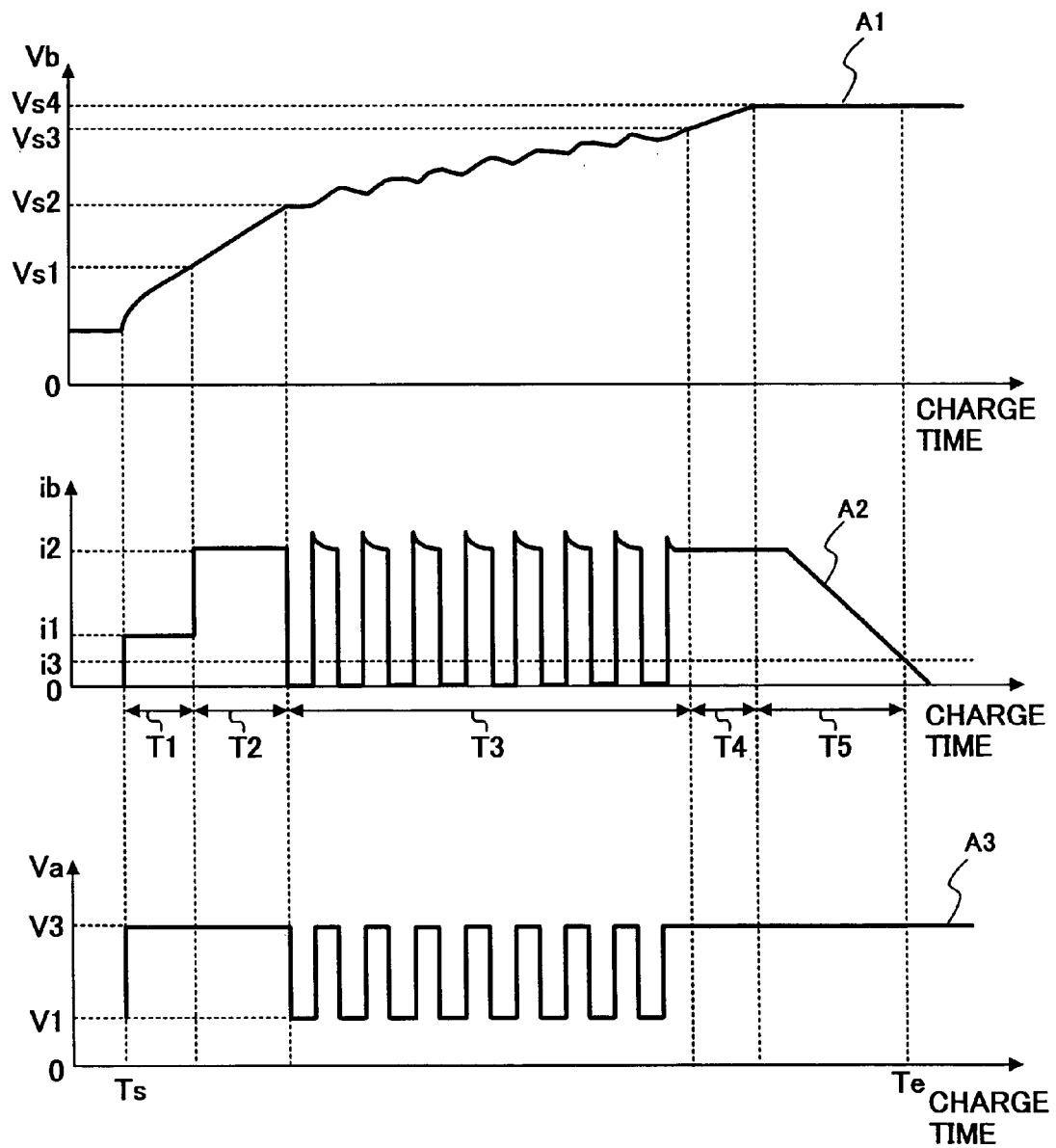
FIG. 2 is a time chart for explaining a charging operation performed by the charging apparatus of FIG. 1.

Referring to FIG. 2, an exemplary operation of the charging apparatus 1 is explained. In FIG. 2, three time charts are combined together using a common time span, in which A1, A2, and A3 represent characteristic curves of the battery voltage Vb, the charging current ib, and a voltage Va output from the voltage switching circuit 24. In FIG. 2, Ts and Te represent time points of a charge start and a charge end, respectively. Likewise, T1, T2, T3, T4, and T5 represent time periods of a pre-charge, a quick charge, a pulse charge, a constant current charge, and a constant voltage charge, respectively.

In FIG. 2, the charge control circuit 8, receiving the first, second, third, and fourth predetermined constant voltages V1–V4, generates a first pre-set voltage Vs1 based on the first predetermined constant voltage V1, second pre-set voltage Vs1 based on the second predetermined constant voltage V2, a third pre-set voltage Vs3 based on the third predetermined constant voltage V3, and a fourth pre-set voltage Vs4 based on the fourth predetermined constant voltage V4. With this configuration, it becomes possible to eliminate an extra power source to generate power to be used by the CCCV charging circuit 4. In the above configuration, the voltages are determined to meet relationships of V4>V3>V2>V1 and Vs4>Vs3>V2>Vs1.

For example, the above-mentioned voltages V1–V4 are set as follows: The forth predetermined constant voltage V4 is pre-set to a voltage exceeding an over-discharge voltage of the lithium ion battery 11. The third predetermined constant voltage V2 is pre-set to a voltage, which the lithium ion battery 11 will have at a fully-charged state. The second predetermined constant voltage V2 is pre-set to a voltage at which a load can be activated. The first pre-set voltage Vs1 is set in a range of from 2.0 volts to 2.2 volts, in cases where a lithium ion battery is used.

After the AC adapter 10 is connected to the power source terminal 15, the charge control circuit 8 receives a signal from the adapter detecting circuit 2 indicating an event that the power is applied. Then, the charge control circuit 8 starts the charge control at time point Ts. The charge control circuit 8 controls the signal switching circuit 23 to output the first predetermined CCR signal S1 and the voltage switching circuit 24 to output the third predetermined constant voltage V3. Based on these actions, the control circuit 26 controls the operations of the control transistor 25 such that the battery voltage Vb indicated by the signal from the voltage detecting circuit 3 is substantially equal to the third predetermined constant voltage V2 and such that the signal from the current detecting circuit 6 indicates that the current ib is substantially equal to the first predetermined constant current i1, so that the lithium ion battery 11 is pre-charged during the time period T1.

The above-mentioned pre-charge cycle is a preliminary charging process for charging the lithium ion battery 11 with a relatively small current until the battery voltage Vb reaches the first pre-set voltage Vs1. This is because a quick charge with a relatively large current to the lithium ion battery 11 in an over-discharged state will cause various problems, for example, a deterioration of the lithium ion battery 11 may be accelerated. A relatively large current may also cause the control transistor 25 functioning as a control element may suffer a relatively large loss of electric power which causes a production of a relatively large amount of heat at the charging apparatus 1.

When the battery voltage Vb becomes substantially equivalent to the first set voltage Vs1, the charge control circuit 8 controls the signal switching circuit 23 to output the second predetermined CCR signal S2 and the third predetermined constant voltage V2 to continue being output to the voltage switching circuit 24. Based on these actions, the control circuit 26 controls the operations of the control transistor 25 such that the battery voltage Vb indicated by the signal from the voltage detecting circuit 3 is substantially equal to the third predetermined constant voltage V2 and such that the signal from the current detecting circuit 6 indicates that the current ib is substantially equal to the second predetermined constant current i2, so that a quick charge is performed relative to the lithium ion battery 11 during the time period T2. The quick charge is applied to quickly charge the lithium ion battery 11 to a state at which the lithium ion battery 11 can activate the load.

When the battery voltage Vb reaches the second pre-set voltage Vs2, the charge control circuit 8 controls the signal switching circuit 23 to continue to output the second predetermined CCR signal S2 and the voltage switching circuit 24 to output the first predetermined constant voltage V1. Accordingly, the control circuit 26 controls the operations of the control transistor 25 such that the battery voltage Vb indicated by the signal from the voltage detecting circuit 3 is substantially equal to the first predetermined constant voltage V1 and that the signal from the current detecting circuit 6 is substantially equal to the second predetermined constant current i2. In this case, since the battery voltage Vb is already greater than the first predetermined constant voltage V1, the control circuit 26 controls the control transistor 25 to turn off the pulse charging (an interruption state) so that the battery current ib to the lithium ion battery 11 does not flow.

When a predetermined time ta is elapsed, the charge control circuit 8 controls the signal switching circuit 23 to continue to output the second predetermined CCR signal S2 and the voltage switching circuit 24 to output the third predetermined constant voltage V3. Accordingly, the control circuit 26 controls the operations of the control transistor 25 such that the battery voltage Vb indicated by the signal from the voltage detecting circuit 3 is substantially equal to the third predetermined constant voltage V2 and that the signal from the current detecting circuit 6 indicates that the current ib is substantially equal to the second predetermined constant current i2. In this case, since the battery voltage Vb is smaller than the third predetermined constant voltage V3, the control circuit 26 controls the control transistor 25 such that the charging current ib flows to the lithium ion battery 11 until the current ib becomes substantially equal to the second constant current i2.

When a predetermined time tb is elapsed, the charge control circuit 8 controls the signal switching circuit 23 to continue to output the second predetermined CCR signal S2 and the voltage switching circuit 24 to output again the first predetermined constant voltage V1. The charge control circuit 8 repeats the above-described operations until the battery voltage Vb becomes substantially equal to the third pre-set voltage Vs3. This repetitive charge process is pulse charging performed during the time period T3. During the time period T3 for the pulse charging, most of the capacity of the lithium ion battery 11 is charged. The pulse charge performed during the time period T3 produces an average charging current flowing through the control transistor 25 and which is approximately one half of the quick charge current value. Therefore, while the pulse charge generally takes a longer charging time than the continuous charge, the control transistor 25 is driven with less heat production. This contributes to the miniaturization of the charging apparatus 1 and, at the same time, to the reduction of the heat production in the lithium ion battery 11 so that the lithium ion battery 11 will have a relatively long life.

When the battery voltage Vb reaches the third pre-set voltage Vs3, the charge control circuit 8 controls the signal switching circuit 23 to continue to output the second predetermined CCR signal S2 and the voltage switching circuit 24 to output the third predetermined constant voltage V3. Accordingly, the control dreuit 26 controls the operations of the control transistor 25 such that the battery voltage Vb indicated by the signal from the voltage detecting circuit 3 is substantially equal to the third predetermined constant voltage V2 and that the signal from the current detecting circuit 6 indicates that the charging current ib is substantially equal to the second predetermined constant current i2. Thus, the constant current charge is performed during the time period T4. The constant current charge is performed following the completion of pulse charging and is completed upon an accurate detection of the full-charge. This constant current charge is the first half of the CCCV charging process.

When the charge process is shifted from pulse charging to continuous charging (i.e., the continuous current charge in the CCCV charge), the average charge current is increased but is still smaller than that of the quick charge since the battery voltage Vb is sufficiently increased during the time period T3 by pulse charging. This suppresses the heat production by the control transistor 25 for a relatively short time period. The electric power consumed by the control transistor 25 can be expressed by a value obtained by multiplying the charge current ib by a difference between the power source voltage Vd and the battery voltage Vb. Accordingly, the electric power consumed by the control transistor 25 becomes small as the battery voltage Vb increases.

The charge current ib is then gradually reduced when the battery voltage Vb is increased to a value substantially equal to the fourth pre-set voltage Vs4. Since the fourth pre-set voltage Vs4 is set to the full-charge voltage value of the lithium ion battery 11, the control circuit 26 naturally shifts its charge mode from the CC (constant current) charge to the CV (constant voltage) charge. When the charge-end detecting circuit 7 detects from the signal output by the current detecting circuit 6 an event that the charge current ib is decreased to a value smaller than the predetermined current value i3, the charge-end detecting circuit 7 sends the predetermined charge-end signal Sce to the charge control circuit 8, which occurs at the time point Te. The constant voltage charge is performed during the time period T5, which starts from the end of the time period T4 and continues to the time point Te. Upon receiving the predetermined charge-end signal Sce, the charge control circuit 8 determines that the charge to the lithium ion battery 11 is completed. In this way, the charging apparatus 1 can accurately detect the fully-charged state of the lithium ion battery 11 by performing the constant current charge and subsequently the constant voltage charge during the last stage of the charging process.

Figure 3A:
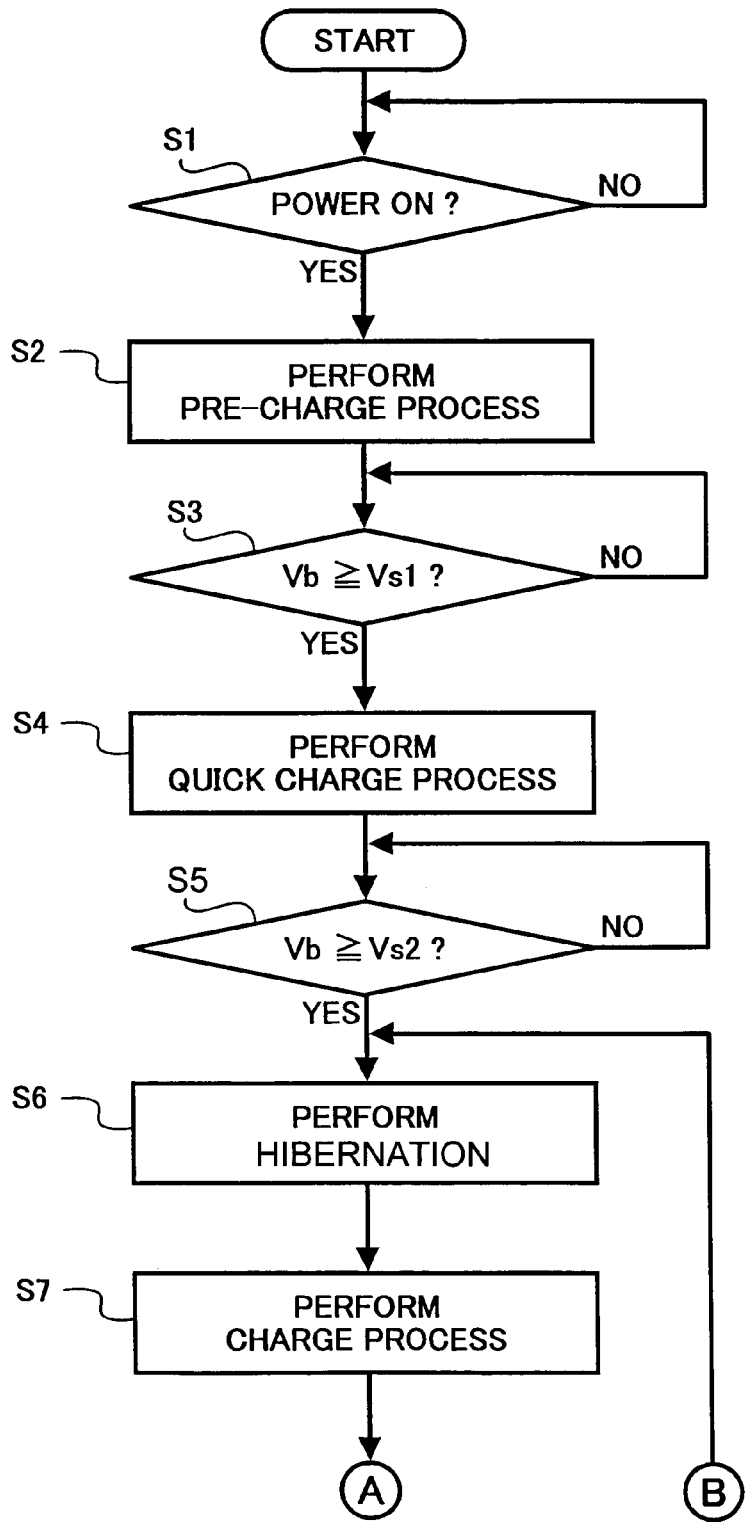

Referring to FIGS. 3, 3A and 3B, an exemplary procedure of the operation performed by the charge control circuit 8 is explained. Steps S1 to S7 are shown in FIG. 3A and Steps S8 to S13 are shown in FIG. 3B. In Step S1 of FIG. 3A, the charge control circuit 8 determines whether it receives the signal from the adapter circuit 2 indicating that the power is supplied. The process of Step S1 is continued until the signal, that power is supplied, is received. When the signal is determined as being received, the charge control circuit 8 performs the pre-charge process, in Step S2. That is, the charge control circuit 8 controls the signal switching circuit 23 to output the first predetermined CCR signal S1 and the voltage switching circuit 24 to output the third predetermined constant voltage V3.

Then, in Step S3, the charge control circuit 8 determines whether the battery voltage Vb is substantially equal to or greater than the first pre-set voltage Vs1. The process of Step S3 continues until the battery voltage Vb is determined to be substantially equal to or greater than the first pre-set voltage Vs1. When the battery voltage Vb is determined to be substantially equal to or greater than the first set voltage Vs1, the charge control circuit 8 performs the quick charge, in Step S4. That is, the charge control circuit 8 controls the signal switching circuit 23 to output the second predetermined CCR signal S2 and the voltage switching circuit 24 to continue to output the third predetermined constant voltage V3.

Then, in Step S5, the charge control circuit 8 determines whether the battery voltage Vb is substantially equal to or greater than the second pre-set voltage Vs2. The process of Step S5 continues until the battery voltage Vb is determined to be substantially equal to or greater than the second pre-set voltage Vs2. When the battery voltage Vb is determined to be substantially equal to or greater than the second set voltage Vs2, the process proceeds to Step S6 in which the charge control circuit 8 performs a charge hibernation. During charge hibernation, the charge process to the lithium ion battery 11 is paused. That is, the charge control circuit 8 controls the signal switching circuit 23 to continue to output the second predetermined CCR signal S2 and the voltage switching circuit 24 to output the first predetermined constant voltage V1. Then, in the predetermined time period ta after the charge hibernation commences, the charge control circuit 8 restarts, in Step S7, the charge process to the lithium ion battery 11 by controlling the CCR signal generating circuit 21 to continue to output the second predetermined CCR signal S2 to the signal switching circuit 23 and the constant voltage generating circuit 22 to output the third predetermined constant voltage V2 to the voltage switching circuit 24.

Then, in Step S8, the charge control circuit 8 determines whether the battery voltage Vb is substantially equal to or greater than the third set voltage Vs3. The process of Step S8 continues until the battery voltage Vb is determined to be substantially equal to or greater than the third pre-set voltage Vs3. When the battery voltage Vb is determined to be substantially equal to or greater than the third pre-set voltage Vs3, the charge control circuit 8 performs the constant current charge, in Step S9. That is, the charge control circuit 8 controls the signal switching circuit 23 to continue to output the second predetermined CCR signal S2 and the voltage switching circuit 24 to output the third predetermined constant voltage V3.

Then, in Step S10, the charge control circuit 8 determines whether the battery voltage Vb is substantially equal to or greater than the fourth set voltage Vs4. The process of Step S10 continues until the battery voltage Vb is determined to be substantially equal to the pre-set voltage Vs4. When the battery voltage Vb is determined to be substantially equal to or greater than the fourth set voltage Vs4, the charge control circuit 8 allows the shift of the charge process, in Step S11. That is, in this situation, the battery current ib is gradually reduced and accordingly the charge is naturally shifted from the constant current charge to the constant voltage charge. Then, in Step S12, the charge control circuit 8 determines whether an event occurs that the battery current ib becomes smaller than the predetermined current value i3 and accordingly the charge control circuit 8 receives the predetermined charge-end signal Sce from the charge-end detecting circuit 7. The charge control circuit 8 continues the process of Step S12 until the charge-end signal Sce is received. When such event is determined as having occurred, the charge control circuit 8 determines that the charge process relative to the lithium ion battery 11 is completed and terminates the charge process, in Step S13.

Figure 4:
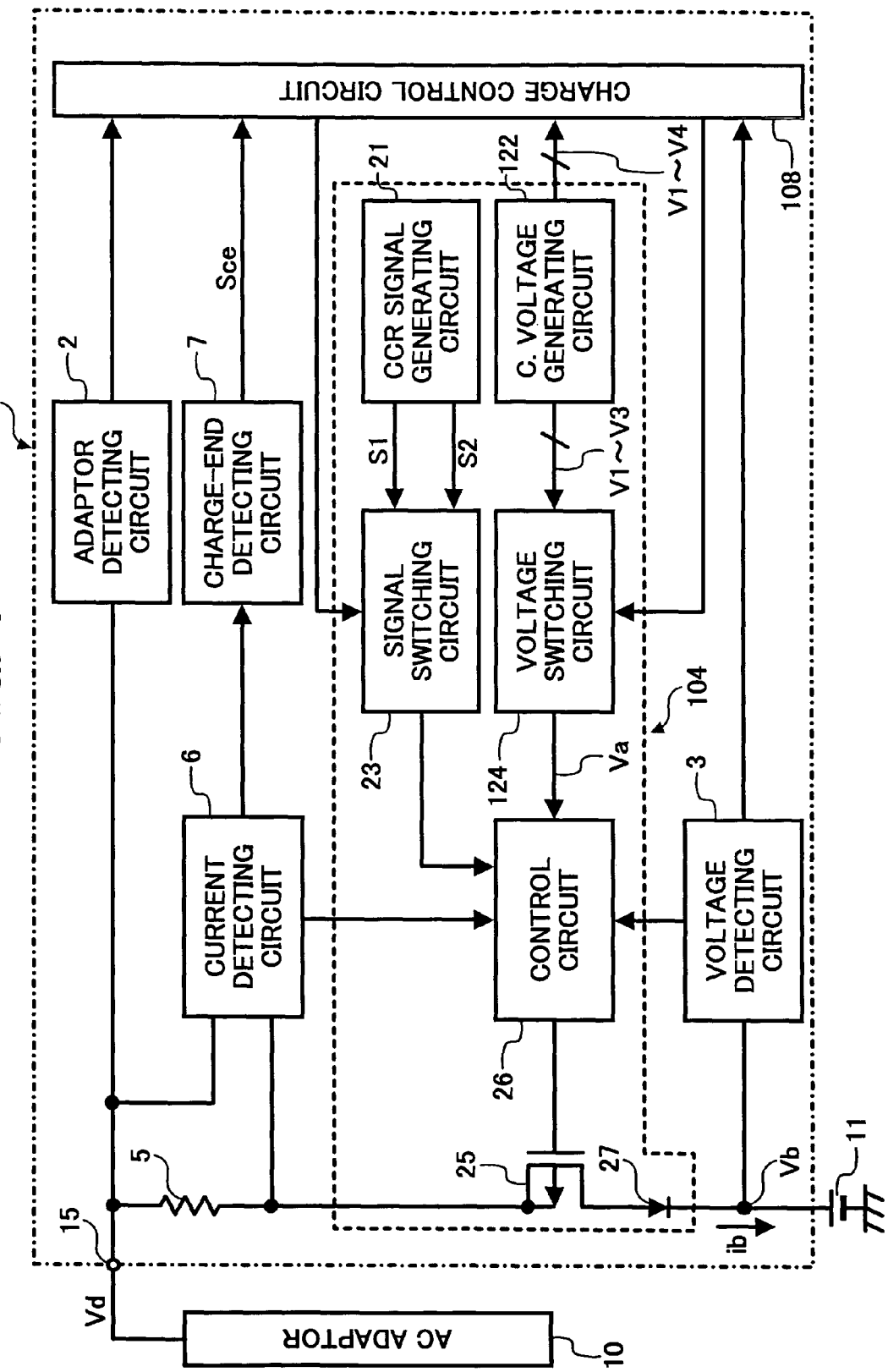
FIG. 4 is a nonaqueous second battery charging apparatus according another preferred embodiment of the present invention.

Several components shown in FIG. 4 can be integrated into a single IC (integrated circuit) chip, including the adapter circuit 2, the voltage detecting circuit 3, the current detecting circuit 6, the charge-end detecting circuit 7, the charge control circuit 108, and several components of the CCCV charging circuit 4 including the constant current reference signal generating circuit 21, the constant voltage generating circuit 22, the signal switching circuit 23, the voltage switching circuit 24, and the control circuit 26. In addition, the diode 27 can also be integrated into the above-mentioned single IC chip.

In this way, the charging apparatus 1 detects an event that the battery voltage Vb exceeds the second pre-set voltage V2. Then, the charging apparatus 1 performs the pulse charge by outputting the second predetermined CCR signal S2 to the signal switching circuit 23 as well as the first predetermined constant voltage V1 during the predetermined time period ta and subsequently the third predetermined constant voltage V2 during the predetermined time period tb to the voltage switching circuit 24 until the time the battery voltage Vb becomes the third set voltage Vs3, as described above. In this charging apparatus 1, the second pre-set voltage Vs1 is set to a value, with which the load the lithium ion battery 11 supplies power to can operate.

Accordingly, the charging time to make the lithium ion battery 11 sufficiently charged to drive the load can be almost the same as that for the conventional rapid charging method. After that, the charging apparatus 1 changes the charge mode to the pulse charge mode in which the battery voltage Vb and the charge current ib are regulated to the respective values, as described above, so as to decrease the average charge current. Thereby, the heat production by the nonaqueous second battery and the control element can be suppressed so that miniaturization of the charging apparatus can be achieved. Moreover, this configuration can reduce the deterioration of the nonaqueous second battery. In addition, an accurate detection of an event that the nonaqueous second battery is filly-charged can be achieved by the arrangement in which the CCCV charging process is performed after the pulse charge.

Next, a nonaqueous-second-battery charging apparatus 100 according to another preferred embodiment of the present invention is explained with reference to FIG. 4. The charging apparatus 100 of FIG. 4 is similar to the charging apparatus 1 of FIG. 1, except for a CCCV (constant-current constant-voltage) charging circuit 104 and a charge control circuit 108. The CCCV charging circuit 104 is similar to the CCCV charging circuit 4 of FIG. 1, except for the constant voltage generating circuit 122 and the voltage switching circuit 124 to handle the first, second, and third constant voltages V1–V2 to perform a three-step change of the voltage Va output from the voltage switching circuit 124. The charge control circuit 108 is similar to the charge control circuit 8 of FIG. 1, except for a circuit portion (not shown) handling the above-mentioned three-step change of the voltage Va.

The charge control circuit 108 receives the first through to fourth constant voltages V1–V4 from the constant voltage generating circuit 122, controls the operations of the signal switching circuit 23 and the voltage switching circuit 124 in response to the signals sent from the adapter detecting circuit 2, the voltage detecting circuit 3, and the charge-end detecting circuit 7. The signal switching circuit 23 receives the first predetermined CCR signal S1 and the second predetermined CCR signal S2 output from the CCR signal generating circuit 21, and selects one of the first and second predetermined CCR signals S1 and S2 in response to the control signal from the charge control circuit 108. The selected signal is output to the control circuit 26. The voltage switching circuit 124 receives the first, second, and third constant voltage V1–V2 output from the constant voltage generating circuit 122, and exclusively selects one of the first, second, and third constant voltage V1–V3 in response to the control signal output from the charge control circuit 108. The selected voltage is output to the control circuit 26.

Figure 5:
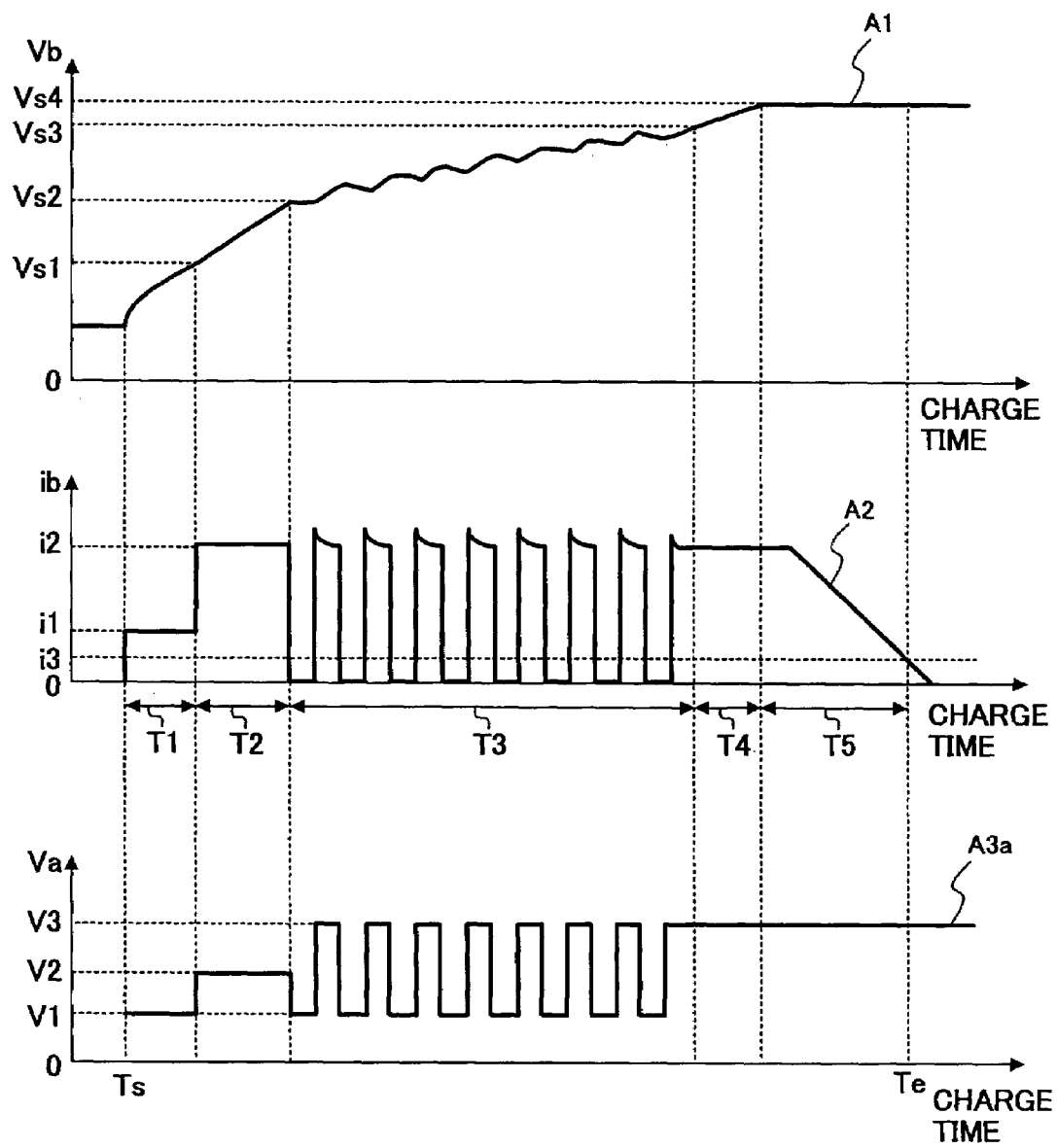
FIG. 5 is a time chart for explaining a charging operation performed by the charging apparatus of FIG. 4.

Referring to FIG. 5, an exemplary operation of the charging apparatus 100 is explained. In FIG. 5, three time charts are combined together using a common time span. The combined three charts are similar to those of FIG. 2, except for A3a which represents a characteristic curve of a voltage Va3 output from the voltage switching circuit 124.

The charge control circuit 108 receives, from the adapter detecting circuit 2, a signal indicating an event that the AC adapter 10 applies power to the charging apparatus 1 by being connected to the power source terminal 15. Then, the charge control circuit 108 starts the charge control at the time point Ts. The charge control circuit 108 controls the signal switching circuit 23 to output the first predetermined CCR signal S1 and also the voltage switching circuit 124 to output the first predetermined constant voltage V1. Based on these actions, the control circuit 26 controls the operations of the control transistor 25 such that the battery voltage Vb indicated by the signal from the voltage detecting circuit 3 is substantially equal to the first predetermined constant voltage V1 and such that the signal from the current detecting circuit 6 indicates that the charging current ib is substantially equal to the first predetermined constant current i1, so that pre-charging is performed relative to the lithium ion battery 11 during the time period T1.

When the battery voltage Vb reaches the first set voltage Vs1, the charge control circuit 108 controls the signal switching circuit 23 to output the second predetermined CCR signal S2 and the voltage switching circuit 124 to output the second predetermined constant voltage V2. Accordingly, the control circuit 26 controls the operations of the control transistor 25 such that the battery voltage Vb indicated by the signal from the voltage detecting circuit 3 is substantially equal to the second predetermined constant voltage V2 and such that the signal from the current detecting circuit 6 indicates that the current ib is substantially equal to the second predetermined constant current i2. As a result, the quick charge is performed relative to the lithium ion battery 11. The operations of the pulse charge, the CC charge, and the CV charge performed after the quick charge are similar to those explained above with reference to FIG. 2 and therefore the explanations are omitted.

Figure 6A:
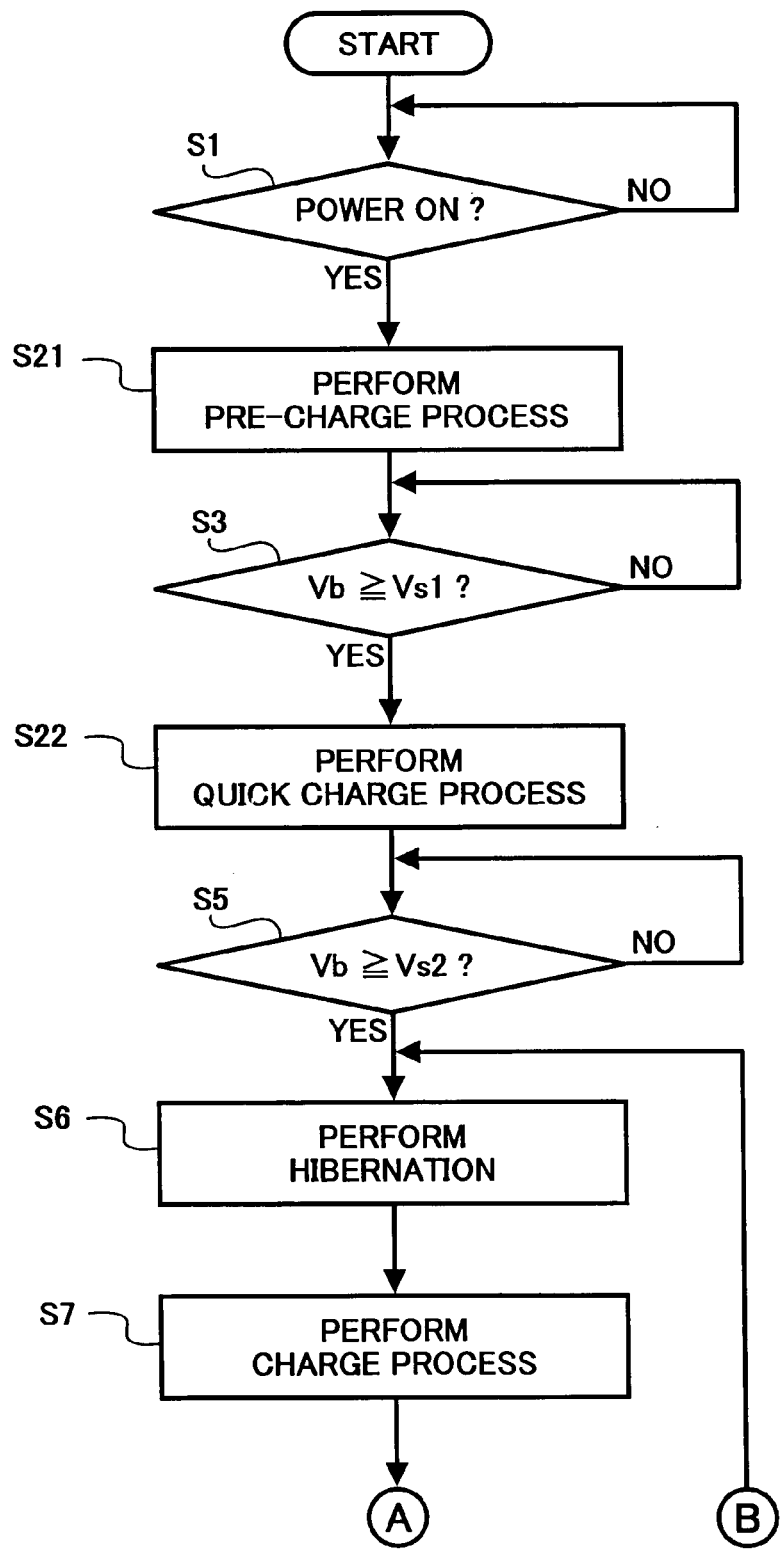
Figure 6B:
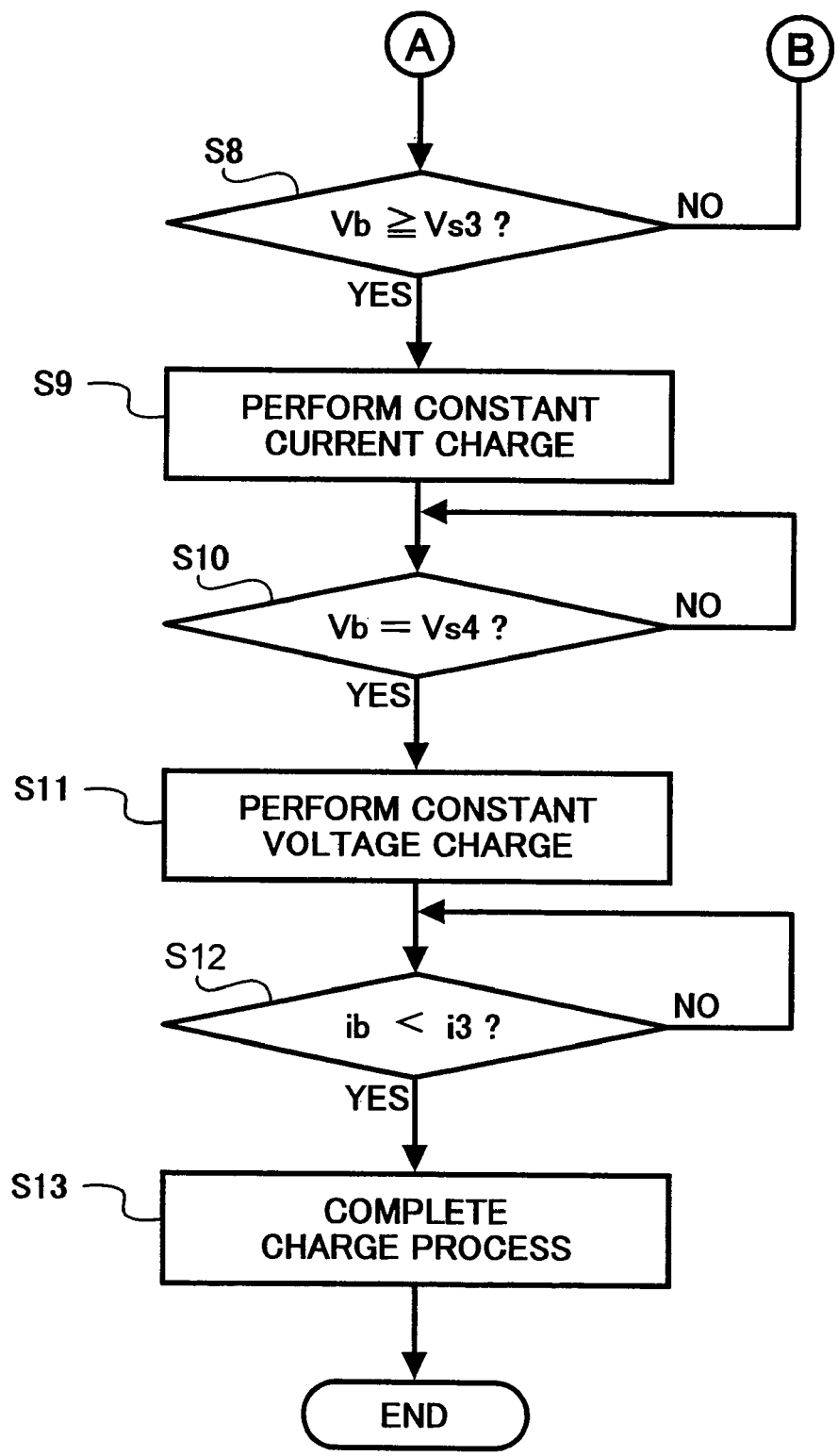

Referring to FIGS. 6, 6A and 6B an exemplary procedure of the operation performed by the charge control circuit 108 is explained. The procedure of FIGS. 6,6A and 6B is similar to that shown in FIGS. 3, 3A and 3B, except for Steps S21 and S22 which replace Steps S2 and S4, respectively, shown in FIG. 3A.

In FIGS. 6, 6A and 6B the charge control circuit 108 first performs the process of Step S1 which is described above with reference to FIG. 3A. Steps S1 to S7 are shown in FIG. 6A and Steps S8 to S13 are shown in FIG. 6B. When the charge control circuit 108 determines in Step S1 that it receives the power-on signal from the adapter detecting circuit 2, the charge control circuit 108 controls the signal switching circuit 23 to output the first constant current reference signal S1 and also the voltage switching circuit 124 to output the first constant voltage V1 so as to perform the pre-charge operation relative to the lithium ion battery 11, in Step S21. Then, the charge control circuit 108 performs the process of Step S3. When the charge control circuit 108 determines in Step S3 that the battery voltage Vb exceeds the first set voltage Vs1, the charge control circuit 108 controls the signal switching circuit 23 to output the second constant current reference signal S2 and also the voltage switching circuit 124 to output the second constant voltage V2 so as to perform the quick charge operation relative to the lithium ion battery 11, in Step S22. After that, the charge control circuit 108 performs the processes of Steps S5–S13 and then terminates the process.

In this way, the nonaqueous second charging apparatus 100 of FIG. 4 performs the charging operation similar to that of the charging apparatus 1 of FIG. 1, except for the above-described process in which the charging apparatus 100 causes the voltage switching circuit 124 to output the first constant voltage V1 during the time period T1 for the pre-charge process and the second constant voltage V2 during the time period T2 for the quick charge process. Therefore, in addition to the charging performance similar to that of the charging apparatus 1, the charging apparatus 100 has the following features; That is, the control circuit 26 accurately controls the battery voltage Vb to be no greater than the first constant voltage V1 in the pre-charge process (during time period T1) and also to be no greater than the second constant voltage V2 in the quick charge process (during time period T2). Therefore, it becomes possible to prevent a problem in that the pulse charge process erroneously starts before the pre-charge or the quick charge process is entirely completed if for any reason the battery voltage Vb is raised. For example, the above problem may occur when a nonaqueous second battery is discharged to an extent of an over discharge state, resulting in a deterioration of the battery. Also, this problem may cause a considerable loss of electric power to the control transistor, resulting in a production of a great amount of heat. However, the charging apparatus 100 having the above-described features can prevent these problems.

In the structures of the charging apparatuses 1 and 100, the signal switching circuit 23 is configured to output the second constant current reference signal S2 during the quick charge process. As an alternative to this, it is possible to configure the signal switching circuit 23 to output the first constant current reference signal S1 during the quick charge process, although it may take a longer time to charge the lithium ion battery 11 to a voltage with which the lithium ion battery 11 can drive the load.

Numerous additional modifications and variations are possible in light of the above teachings. It is, therefore, to be understood that within the scope of the appended claims, the disclosure of this patent specification may be practiced otherwise than as specifically described herein.

What is claimed is:

1. A battery charging apparatus which charges a battery, comprising:
   a voltage detecting circuit arranged and configured to detect a battery voltage of said battery and for outputting a signal in response to a detected battery voltage;
   a current detecting circuit arranged and configured to detect a charging current supplied to said battery and for outputting a signal in response to a detected charging current;
   a charging circuit arranged and configured to control said charging current such that said detected battery voltage increases to become substantially equal to a first pre-set voltage in response to a first input control signal and also such that said detected charging current becomes substantially equal to a constant current predetermined in response to a second input control signal; and
   a charge control circuit that instructs said charging circuit by said first and said second input control signals to set said first pre-set voltage and said constant current in response to said signal from said voltage detecting circuit,
   wherein the charge control circuit is arranged and configured to instruct the charging circuit to perform constant current charging to flow a first constant current to the battery and subsequently to flow a second constant current greater than the first constant current to the battery when the detected battery voltage of the battery is smaller than a second pre-set voltage, and to instruct the charging circuit to perform pulse charging, in which flowing current to said battery and pausing current flow to said battery are alternately performed at intervals of a pre-determined time period,
   wherein the charge control circuit instructs the charging circuit to control the charging current flowing to the battery such that a charging voltage applied across said battery becomes substantially equal to a third constant voltage during the constant current charging during the pulse charging and also such that the charging voltage becomes substantially equal to a first constant voltage smaller than the third constant voltage during the pausing in the pulse charging, and
   wherein the charge control circuit instructs the charging circuit to control the charging current flowing through the battery such that the charging voltage becomes substantially equal to the first constant voltage when the battery voltage is smaller than the first pre-set voltage which is smaller than the second pre-set voltage and also such that the charging voltage becomes substantially equal to the second constant voltage which is less than the third constant voltage and greater than the first constant voltage, during the constant current charging before the pulse charging is executed.

2. A battery charging apparatus which charges a battery, comprising:
   a voltage detecting circuit arranged and configured to detect a battery voltage of said battery and for outputting a signal in response to a detected battery voltage;
   a current detecting circuit arranged and configured to detect a charging current supplied to said battery and for outputting a signal in response to a detected charging current;
   a charging circuit arranged and configured to control said charging current such that said detected battery voltage increases to become substantially equal to a first pre-set voltage in response to a first input control signal and also such that said detected charging current becomes substantially equal to a constant current predetermined in response to a second input control signal; and
   a charge control circuit that instructs said charging circuit by said first and said second input control signals to set said first pre-set voltage and said constant current in response to said signal from said voltage detecting circuit.
   wherein the charge control circuit is arranged and configured to instruct the charging circuit to perform constant current charging to flow a first constant current to the battery and subsequently to flow a second constant current greater than the first constant current to the battery when the detected battery voltage of the battery is smaller than a second pre-set voltage, and to instruct the charging circuit to perform pulse charging, in which flowing current to said battery and pausing current flow to said battery are alternately performed at intervals of a pre-determined time period.
   wherein the charge control circuit instructs the charging circuit to control the charging current flowing to the battery such that a charging voltage applied across said battery becomes substantially equal to a third constant voltage during the constant current charging during the pulse charging and also such that the charging voltage becomes substantially equal to a first constant voltage smaller than the third constant voltage during the pausing in the pulse charging,
   wherein the charge control circuit instructs the charging circuit to control the charging current flowing through the battery such that the charging voltage becomes substantially equal to the third constant voltage during the constant current charging before the pulse charging is executed, and
   wherein the charging circuit further comprises:
      a constant voltage generating circuit that generates said first, second, and third constant voltages;
      a voltage switching circuit that selects and outputs one of the first and third constant voltages output from the constant voltage generating circuit in accordance with the control signals from the charge control circuit;
      a control transistor that outputs a current to the battery in response to a control signal input to the control transistor; and
      a control circuit that controls the control transistor such that the battery voltage represented by a signal output from the voltage detecting circuit becomes substantially equal to a voltage represented by a signal output from the voltage switching circuit and that the charging current represented by a signal output from the current detecting circuit becomes substantially equal to a constant current represented by a signal output from the a signal switching circuit arranged and configured to supply signals to said control circuit.

3. The battery charging apparatus as defined in claim 1, wherein the charging circuit further comprises:
   a constant voltage generating circuit that generates the first, second, and third constant voltages;
   a voltage switching circuit that selects and outputs one of the first and third constant voltages output from the constant voltage generating circuit in accordance with the control signals from the charge control circuit;
   a control transistor that outputs a current to the second battery in response to a control signal input thereto; and
   a control circuit that controls the control transistor such that the battery voltage represented by a signal output from the voltage detecting circuit becomes substantially equal to a voltage represented by a signal output from the voltage switching circuit and that the charging current represented by a signal output from the current detecting circuit becomes substantially equal to a constant current represented by a signal received from a signal switching circuit.

4. The battery charging apparatus as defined in claim 2, wherein the current detecting circuit comprises:
   a resistor through which the charging current to be supplied to the battery flows; and
   a current detector that detects the charging current based on a voltage across the resistor and outputs a signal in response to the detected charging current,
   wherein the voltage detecting circuit, the current detector of the current detecting circuit, the charge control circuit, a charge-end detecting circuit, and several components of the charging circuit including a constant voltage generating circuit, a voltage switching circuit, a constant current reference signal generating circuit, a signal switching circuit, and a control circuit are integrated into a single integrated circuit chip.

5. The battery charging apparatus as defined in claim 3, wherein the current detecting circuit comprises:
   a resistor through which the charging current to be supplied to the battery flows; and
   a current detector that detects the charging current based on a voltage across the resistor and outputs a signal in response to the detected charging current,
   wherein the voltage detecting circuit, the current detector of the current detecting circuit, the charge control circuit, a charge-end detecting circuit, and several components of the charging circuit including a constant voltage generating circuit, a voltage switching circuit, a constant current reference signal generating circuit, a signal switching circuit, and a control circuit are integrated into a single integrated circuit chip.

6. A charging method for a battery, comprising the steps of:
   first performing a first constant current charging by supplying a first constant current to the battery when a battery voltage of the battery is smaller than a first pre-set voltage;
   second performing a second constant current charging by supplying a second constant current greater than the first constant current to the battery when the battery voltage of the battery is greater than the first pre-set voltage; and
   operating a pulse charging of the battery when the battery voltage of the battery increases to be equal to or greater than a second pre-set voltage greater than the first pre-set voltage by alternately carrying out, at intervals of a predetermined time period, a constant current charging in which the second constant current is supplied to the battery and a pausing in which the supply of the constant current charging is stopped,
   wherein the operating step comprises controlling a charging current to the battery such that a charging voltage of the battery becomes substantially equal to a third constant voltage during the constant current charging of the pulse charging and such that the charging voltage of the battery becomes substantially equal to a first constant voltage smaller than the third constant voltage during the pausing of the pulse charging, and
   wherein the charging current to the battery is controlled such that the charging voltage of the battery becomes substantially equal to the first constant voltage when the battery voltage of the battery is smaller than the first pre-set voltage during the first constant current charging and such that the charging voltage of the battery becomes substantially equal to a second constant voltage smaller than the third constant voltage and greater than the first constant voltage during the first constant current charging.

7. A battery charging apparatus which charges a battery, comprising:
   a voltage detecting circuit arranged and configured to detect a battery voltage of said battery and for outputting a signal in response to a detected battery voltage;
   a current detecting circuit arranged and configured to detect a charging current supplied to said battery and for outputting a signal in response to a detected charging current;
   a charging circuit arranged and configured to control said charging current such that said detected battery voltage increases to become substantially equal to a first pre-set voltage in response to an input control signal and also such that said detected charging current becomes substantially equal to a constant current predetermined in response to the input control signal; and
   a charge control circuit that instructs said charging circuit by the input control signal to set said first pre-set voltage and said constant current in response to said signal from said voltage detecting circuit,
   wherein the charge control circuit is arranged and configured to instruct the charging circuit to perform constant current charging to flow a first constant current to the battery and subsequently to flow a second constant current greater than the first constant current to the battery when the detected battery voltage of the battery is smaller than a second pre-set voltage, and to instruct the charging circuit to perform pulse charging, in which flowing current to said battery and pausing current flow to said battery are alternately performed at intervals of a pre-determined time period,
   wherein the charge control circuit instructs the charging circuit to control the charging current flowing to the battery such that a charging voltage applied across said battery becomes substantially equal to a third constant voltage during the constant current charging during the pulse charging and also such that the charging voltage becomes substantially equal to a first constant voltage smaller than the third constant voltage during the pausing in the pulse charging, and
   wherein the charge control circuit instructs the charging circuit to control the charging current flowing through the battery such that the charging voltage becomes substantially equal to the first constant voltage when the battery voltage is smaller than the first pre-set voltage which is smaller than the second pre-set voltage and also such that the charging voltage becomes substantially equal to the second constant voltage which is less than the third constant voltage and greater than the first constant voltage, during the constant current charging before the pulse charging is executed.

8. A battery charging apparatus which charges a battery, comprising:
   a voltage detecting circuit arranged and configured to detect a battery voltage of said battery and for outputting a signal in response to a detected battery voltage;
   a current detecting circuit arranged and configured to detect a charging current supplied to said battery and for outputting a signal in response to a detected charging current;
   a charging circuit arranged and configured to control said charging current such that said detected battery voltage increases to become substantially equal to a first pre-set voltage in response to an input control signal and also such that said detected charging current becomes substantially equal to a constant current predetermined in response to the input control signal;
   a charge control circuit that instructs said charging circuit by the input control signal to set said first pre-set voltage and said constant current in response to said signal from said voltage detecting circuit;
   a constant voltage generating circuit that generates said first, and third constant voltages;
   a voltage switching circuit that selects and outputs one of the first and third constant voltages output from the constant voltage generating circuit in accordance with the control signals from the charge control circuit;
   a control transistor that outputs a current to the battery in response to a control signal input to the control transistor; and
   a control circuit that controls the control transistor such that the battery voltage represented by a signal output from the voltage detecting circuit becomes substantially equal to a voltage represented by a signal output from the voltage switching circuit and that the charging current represented by a signal output from the current detecting circuit becomes substantially equal to a constant current represented by a signal output from a signal switching circuit arranged and configured to supply signals to said control circuit,
   wherein the charge control circuit is arranged and configured to instruct the charging circuit to perform constant current charging to flow a first constant current to the battery and subsequently to flow a second constant current greater than the first constant current to Like battery when the detected battery voltage of the battery is smaller than a second pre-set voltage, and to instruct the charging circuit to perform pulse charging, in which flowing current to said battery and pausing current flow to said battery are alternately performed at intervals of a pre-determined time period,
   wherein the charge control circuit instructs the charging circuit to control the charging current flowing to the battery such that a charging voltage applied across said battery becomes substantially equal to a third constant voltage during the constant current charging during the pulse charging and also such that the charging voltage becomes substantially equal to a first constant voltage smaller than the third constant voltage during the pausing in the pulse charging, and
   wherein the charge control circuit instructs the charging circuit to control the charging current flowing through the battery such that the charging voltage becomes substantially equal to the third constant voltage during the constant current charging before the pulse charging is executed.

9. The battery charging apparatus as defined in claim 7, wherein the charging circuit further comprises:
   a constant voltage generating circuit that generates the first, and third constant voltages;
   a voltage switching circuit that selects and outputs one of the first and third constant voltages output from the constant voltage generating circuit in accordance with the control signals from the charge control circuit;
   a control transistor that outputs a current to the battery in response to a control signal input thereto; and
   a control circuit that controls the control transistor such that the battery voltage represented by a signal output from the voltage detecting circuit becomes substantially equal to a voltage represented by a signal output from the voltage switching circuit and that the charging current represented by a signal output from the current detecting circuit becomes substantially equal to a constant current represented by a signal received from a signal switching circuit.

10. The battery charging apparatus as defined in claim 7, wherein the current detecting circuit comprises:
    a resistor through which the charging current to be supplied to the battery flows; and
    a current detector that detects the charging current based on a voltage across the resistor and outputs a signal in response to the detected charging current,
    wherein the voltage detecting circuit, the current detector of the current detecting circuit, the charge control circuit, a charge-end detecting circuit, and several components of the charging circuit including a constant voltage generating circuit, a voltage switching circuit, a constant current reference signal generating circuit, a signal switching circuit, and a control circuit are integrated into a single integrated circuit chip.

11. The battery charging apparatus as defined in claim 9, wherein the current detecting circuit comprises:
    a resistor through which the charging current to be supplied to the battery flows; and
    a current detector that detects the charging current based on a voltage across the resistor and outputs a signal in response to the detected charging current,
    wherein the voltage detecting circuit, the current detector of the current detecting circuit, the charge control circuit, a charge-end detecting circuit, and several components of the charging circuit including a constant voltage generating circuit, a voltage switching circuit, a constant current reference signal generating circuit, a signal switching circuit, and a control circuit are integrated into a single integrated circuit chip.

* * * * *